United States Patent
Price et al.

(10) Patent No.: US 11,192,305 B2
(45) Date of Patent: Dec. 7, 2021

(54) WINDOW CASSETTES FOR REDUCED POLYMERIZATION INHIBITOR IRREGULARITY DURING ADDITIVE MANUFACTURING

(71) Applicant: Carbon, Inc., Redwood City, CA (US)

(72) Inventors: R. Griffin Price, Redwood City, CA (US); Bob E. Feller, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 111 days.

(21) Appl. No.: 16/547,694

(22) Filed: Aug. 22, 2019

(65) Prior Publication Data

US 2020/0061919 A1    Feb. 27, 2020

Related U.S. Application Data

(60) Provisional application No. 62/722,493, filed on Aug. 24, 2018.

(51) Int. Cl.
*B29C 64/321* (2017.01)
*B33Y 30/00* (2015.01)
(Continued)

(52) U.S. Cl.
CPC .......... *B29C 64/321* (2017.08); *B29C 64/124* (2017.08); *B29C 64/245* (2017.08);
(Continued)

(58) Field of Classification Search
CPC ... B29C 64/245; B29C 64/255; B29C 64/106; B29C 64/124; B29C 64/321; B33Y 40/00; B33Y 40/10; B33Y 30/00
See application file for complete search history.

(56) References Cited

U.S. PATENT DOCUMENTS

| 5,236,637 A | 8/1993 | Hull |
| 5,391,072 A | 2/1995 | Lawton |

(Continued)

FOREIGN PATENT DOCUMENTS

| WO | 2015195924 | 12/2015 |
| WO | 2016007495 | 1/2016 |

(Continued)

OTHER PUBLICATIONS

Tumbleston et al., "Continuous Liquid Interface Production of 3D Objects", Science, 347, Mar. 20, 2015, pp. 1349-1352.
(Continued)

*Primary Examiner* — Philip C Tucker
*Assistant Examiner* — Jimmy R Smith, Jr.
(74) *Attorney, Agent, or Firm* — Myers Bigel, P.A.

(57) ABSTRACT

The present disclosure describes a window cassette for a bottom-up additive manufacturing apparatus. The window cassette includes an optically transparent semipermeable member, on which the semipermeable member a three-dimensional object can be produced, a frame surrounding and connected to the semipermeable member, and a fluid supply bed in or adjacent the semipermeable member and configured to feed a polymerization inhibitor through the semipermeable member. The fluid supply bed has at least two opposing sides and includes a first channel array having an inlet orifice and an outlet orifice and a second channel array interdigitated with but separate from the first channel array, and the second channel array having an inlet orifice and an outlet orifice. An apparatus for producing a three-dimensional object by additive manufacturing utilizing a window cassette is also described.

10 Claims, 3 Drawing Sheets

(51) Int. Cl.
*B29C 64/245* (2017.01)
*B33Y 40/00* (2020.01)
*B29C 64/124* (2017.01)
*B29C 64/264* (2017.01)

(52) U.S. Cl.
CPC .............. *B33Y 30/00* (2014.12); *B33Y 40/00* (2014.12); *B29C 64/264* (2017.08)

(56) References Cited

U.S. PATENT DOCUMENTS

| | | | |
|---|---|---|---|
| 5,529,473 | A | 6/1996 | Lawton |
| 7,438,846 | B2 | 10/2008 | John |
| 7,892,474 | B2 | 2/2011 | Shkolnik |
| 8,110,135 | B2 | 2/2012 | El-Siblani |
| 8,535,779 | B1 | 9/2013 | Smith |
| 8,574,704 | B2 | 11/2013 | Smith |
| 9,205,601 | B2 | 12/2015 | DeSimone |
| 9,211,678 | B2 | 12/2015 | DeSimone |
| 9,216,546 | B2 | 12/2015 | DeSimone |
| 9,360,757 | B2 | 6/2016 | DeSimone |
| 9,453,142 | B2 | 9/2016 | Rolland |
| 9,498,920 | B2 | 11/2016 | DeSimone |
| 9,598,606 | B2 | 3/2017 | Rolland |
| 9,676,963 | B2 | 6/2017 | Rolland |
| 2013/0292862 | A1* | 11/2013 | Joyce .................... B29C 64/307 264/40.1 |
| 2013/0295212 | A1 | 11/2013 | Chen |
| 2014/0290478 | A1 | 10/2014 | Liu |
| 2016/0046075 | A1* | 2/2016 | DeSimone ............ B29C 64/129 264/401 |
| 2016/0193786 | A1 | 7/2016 | Moore |
| 2016/0200052 | A1 | 7/2016 | Moore |
| 2017/0129169 | A1 | 5/2017 | Batchelder |
| 2020/0269512 | A1* | 8/2020 | Lambright .............. B29C 31/06 |

FOREIGN PATENT DOCUMENTS

| | | |
|---|---|---|
| WO | 2016123499 | 8/2016 |
| WO | 2016123506 | 8/2016 |
| WO | 2016140886 | 9/2016 |
| WO | 2016149014 | 9/2016 |
| WO | 2016149097 | 9/2016 |

OTHER PUBLICATIONS

Janusziewicz et al., "Layerless Fabrication with Continuous Liquid Interface Production", Proc. Nat'l. Acad. Sci. USA, vol. 113, No. 42, Oct. 18, 2016, pp. 11703-11708.

* cited by examiner

WINDOW CASSETTES FOR REDUCED POLYMERIZATION INHIBITOR IRREGULARITY DURING ADDITIVE MANUFACTURING

RELATED APPLICATIONS

This application claims the benefit of and priority to United Stated Provisional Patent Application Ser. No. 62/722,493, filed Aug. 24, 2018, the disclosure of which is incorporated by reference herein in its entirety.

FIELD OF THE INVENTION

The present invention concerns additive manufacturing, and in particularly stereolithography, including continuous liquid interface production (CLIP).

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin on the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

Techniques such as CLIP harness inhibitors of polymerization such as oxygen to the benefit of the stereolithography process. However, the inhibitors can be consumed, and when consumed must be re-supplied, particularly when the process is operated rapidly. And rapid operation of the process can lead to seemingly unrelated additional problems, such as cavitation and bubble formation in the polymerizable liquid beneath the growing three-dimensional object, leading to defect formation within the object itself. Accordingly, a need remains for new techniques in bottom-up stereolithography.

SUMMARY OF THE INVENTION

In some embodiments, a window cassette for a bottom-up additive manufacturing apparatus includes (a) an optically transparent semipermeable member, on which the semipermeable member a three-dimensional object can be produced; (b) a frame surrounding and connected to the semipermeable member; and (c) a fluid supply bed in or adjacent to the semipermeable member and configured to feed a polymerization inhibitor through the semipermeable member, the fluid supply bed having at least two opposing sides; and the fluid supply bed including: (i) a first channel array having an inlet orifice and an outlet orifice; and (ii) a second channel array interdigitated with, but separate from, the first channel array, the second channel array having an inlet orifice and an outlet orifice.

In some embodiments, the window cassette includes an impermeable support member positioned below the fluid supply bed.

In some embodiments, the fluid supply bed includes a lateral flow bed.

In some embodiments, the fluid supply bed may be positioned between the semipermeable member and the impermeable member.

In some embodiments, the semipermeable member may comprise an amorphous fluoropolymer.

In some embodiments, the polymerization inhibitor may flow in a first direction through the first channel array and may flow in a second opposite direction through the second channel array.

In some embodiments, the window cassette includes an adhesive layer.

In some embodiments, the first channel array includes a plurality of intergitiated arrays and the second channel array includes a plurality of intergitiated arrays, and the interdigitated first channel arrays alternate with the interdigitated second channel arrays.

In some embodiments, the impermeable member comprises a transparent material.

In some embodiments, an apparatus for producing a three-dimensional object by additive manufacturing includes (a) a light source; (b) a carrier or carrier mount positioned above said light source, on which said carrier a three-dimensional object can be produced; (c) a window cassette positioned between the light source and the carrier, the window cassette including an optically transparent semipermeable member, a frame surrounding and connected to the semipermeable member, and a fluid supply bed having at least two opposing sides, the fluid supply bed in or adjacent to the semipermeable member and configured to feed a polymerization inhibitor through the semipermeable member; (d) a drive assembly operatively associated with the carrier and the window cassette and configured to advance the carrier and the window cassette away from one another; (e) a fluid supply connected to the fluid supply bed, the fluid supply comprising a polymerization inhibitor; and (f) optionally, a vacuum source connected to the fluid supply bed.

In some embodiments, the fluid supply bed of the apparatus may include (i) a first channel array having an inlet orifice and an outlet orifice; and (ii) a second channel array interdigitated with, but separate from, the first channel array, the second channel array having an inlet orifice and an outlet orifice.

In some embodiments, the polymerization inhibitor may flow in a first direction through the first channel array and may flow in a second opposite direction through the second channel array.

In some embodiments, the polymerization inhibitor flows through the first and second channel arrays in a direction from a higher pressure to a lower pressure, the direction of flow alternating within each interdigitated channel array.

In some embodiments, the vacuum source is present and connected to the first and second channel arrays.

In some embodiments, the fluid supply may comprise a gas.

In some embodiments, the polymerization inhibitor may comprise oxygen.

In some embodiments, the fluid supply may comprise an oxygen-enriched gas at a pressure less than atmospheric pressure.

In some embodiments, the apparatus includes an upper manifold and a lower manifold connected to said first and second channel arrays.

In some embodiments, the upper manifold provides a first pressure of gas and the lower manifold provides a second different pressure of gas to induce flow of the polymerization inhibitor through the first and second channel arrays.

In some embodiments, the window cassette may be removable from the apparatus.

DETAILED DESCRIPTION OF ILLUSTRATIVE EMBODIMENTS

Figure 1:
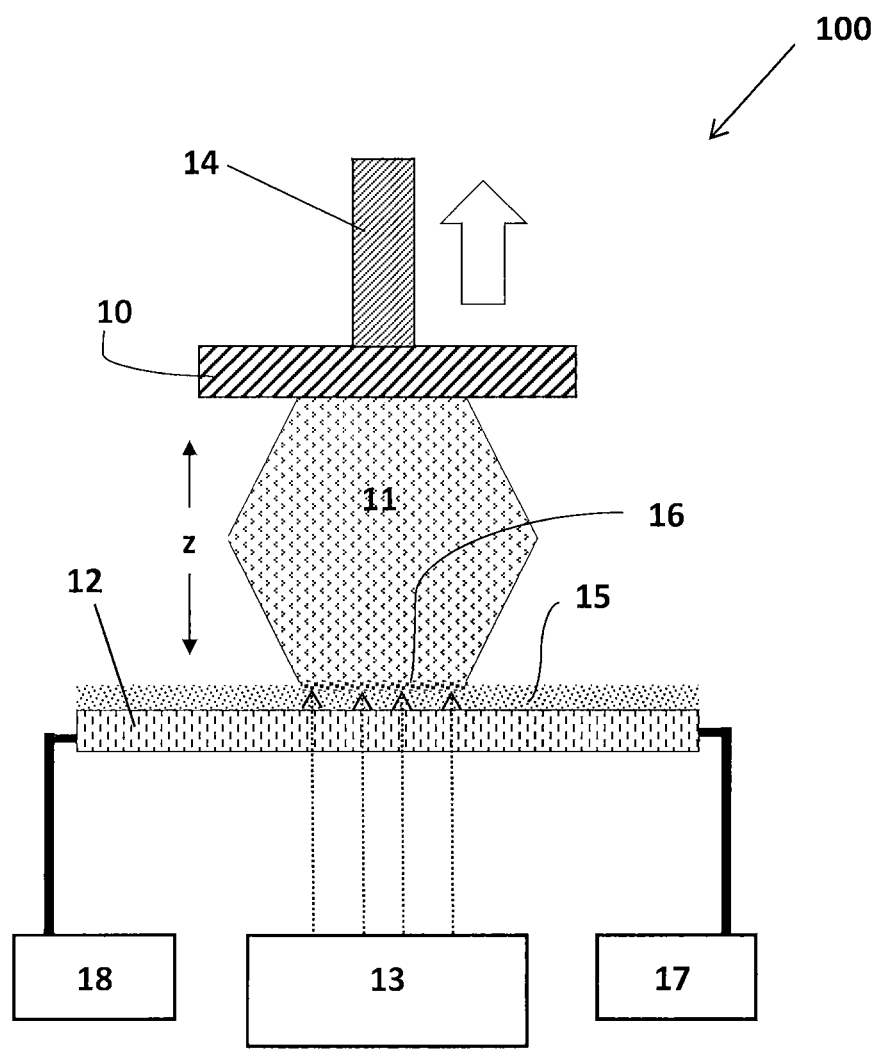
FIG. 1 schematically illustrates a bottom-up stereolithography apparatus for producing a three-dimensional object by additive manufacturing according to embodiments of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the the irradiating and/or the advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The particular manner of description is not critical, and the present invention can be used in any of a variety of systems that employ a semipermeable build plate, through which an inhibitor of polymerization passes, whether explicitly referred to as "CLIP" or not.

The apparatus can include a local controller that contains and executes operating instructions for the production of a three dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., Three-dimensional printing with reciprocal feeding of polymerizable liquid PCT Patent Application Publication No. WO 2015/195924 (published 23 Dec. 2015); Sutter et al., Fabrication of three dimensional objects with multiple operating modes, PCT Patent Application Publication No. WO 2016/140886 (published 9 Sep. 2016); J. DeSimone et al., Methods and apparatus for continuous liquid interface production with rotation, PCT Patent Application Publication No. WO 2016/007495 (published 14 Jan. 2016); see also J. DeSimone et al., U.S. Pat. No. 9,211,678, and J. Batchelder et al., Continuous liquid interface production system with viscosity pump, US Patent Application Publication No. 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, Calif. 94063 USA.

Numerous resins for use in additive manufacturing are known and can be used in carrying out the present invention. See, e.g., U.S. Pat. No. 9,205,601 to DeSimone et al.

In some embodiments, the resin is a dual cure resin. Such resins are described in, for example, Rolland et al., U.S. Pat. Nos. 9,676,963; 9,598,606; and 9,453,142, the disclosures of which are incorporated herein by reference.

Resins may be in any suitable form, including "one pot" resins and "dual precursor" resins (where cross-reactive constituents are packaged separately and mixed together before use, and which may be identified as an "A" precursor resin and a "B" precursor resin).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), epoxy resin (EPX), or urethane methacrylate resin (UMA), all available from Carbon, Inc., 1089 Mills Way, Redwood City, Calif. 94063 USA.

2. Window Cassettes.

In general, a window cassette or build plate for use in the present invention may comprise any suitable semipermeable or permeable material (that is, permeable to the polymerization inhibitor) including amorphous fluoropolymers, such as an amorphous thermoplastic fluoropolymer like TEFLON AF 1600™ or TEFLON AF 2400™ fluoropolymer films, or perfluoropolyether (PFPE), particularly a crosslinked PFPE film, or a crosslinked silicone polymer film. Beneath that may be a fluid bed layer, such as provided by a gas permeable material, optionally containing channels or cavities, such as a permeable polymer (e.g., poly(dimethylsiloxane) (PDMS). A base or support member (such as glass or sapphire) may be included at the bottom of the window if necessary, and may serve to further define the fluid supply bed. The build plate may be supported by a peripheral frame, with the two together forming a removable window cassette as discussed below.

In some embodiments, the pressure and gas supply to the build plate may be controlled to reduce bubble or voids formed by excess gasses, such as nitrogen, in the polymerizable liquid (e.g., resin) of in the 3D printing process and apparatus. Although the methods described herein may be performed by controlling a pressure and/or content of the gas supplied to the build plate using a pressure controller/gas supply, it should be understood that any suitable system may be used, including alternative build plates. For example, any permeable build plate may be positioned such that the side opposite the build surface is in a pressure-controlled chamber, or any suitable configuration of pressure-pressure controlled channels may be used.

The amount and duration of the reduced pressure applied to the polymerizable liquid through the optically transparent member is preferably sufficient to reduce a gas concentration in the polymerizable liquid. The pressure may be at 0%, 5%, 10%, 20%, 25%, 30%, 40% to 50%, 60%, 70%, 80%, 90% or 100% of atmospheric pressure. The oxygen or polymerization inhibitor gas composition of the gas supplied may be 20%, 25%, 30%, 40% to 50%, 60%, 70%, 80%, 90% or 100% oxygen.

In some embodiments, the polymerizable liquid has a gradient of gas concentration, which determines an amount of irradiation or "dose" to cure the polymerizable liquid. For example, the polymerizable liquid can have a lower region on the optically transparent member, and an upper region on the lower region opposite the optically transparent member such that the lower region has a higher dose to cure than the upper region. The applied reduced pressure to the polymerizable liquid through the optically transparent member may reduce a gas concentration in the upper region, while maintaining the polymerization inhibitor gas in the lower region, which consequently reduces a thickness of the dead zone. In some embodiments, the thickness of the lower region is less than about 1000 microns or between about 1, 2, 5, 10, 20 50, 100, 200 300 to 400, 500, 600, 700, 800, 900 or 1000 microns.

In some embodiments, oxygen gas may be used as the polymerization inhibitor. Oxygen may be supplied at any suitable pressure, and is preferably supplied at a pressure that is less than atmospheric pressure. In particular embodiments, the pressure of the oxygen is substantial equal to a partial pressure of oxygen in air at atmospheric pressure (e.g., 100% oxygen supplied at about 0.2 atm). The polymerization inhibitor gas may also be substantially devoid of nitrogen or other gases that do not substantially contribute to polymerization inhibition in the dead zone.

Without wishing to be bound by any particular theory, resins that are saturated with gas are prone to degassing when the local pressure drops. Large pressure drops can occur during the build platform movement and resin refill. When the separation of the printed part and window result in gas coalescence, voids may be formed in the printed part. Accordingly, controlling the pressure of a gas or applying a vacuum through the gas permeable build plate may reduce the level of dissolved gases prior to the pressure change, and reducing an amount of dissolved gas may increase the pressure differential that the resin can experience prior to void formation. The build plate is permeable to gasses, and equilibrium may be established at the build plate/resin interface relatively quickly. Cycling between air (or oxygen) and vacuum for printing formation and part movement, respectively, may permit the CLIP process to be performed with a maximum pressure differential on the resin prior to void formation the part. Moreover, the removal of nitrogen, which is not an active component of polymerization inhibition, may reduce the overall gas level and further reduce the formation of bubbles or voids in the printed part.

In addition, while oxygen delivery to the interface between the polymerizable liquid and the build plate is desirable, oxygen in the regions of the polymerizable liquid that are further away from the interface may lead to a larger dosage of irradiation to cure the polymerizable liquid, which results in a longer exposure time and slower print speeds. Reducing the overall oxygen level may lead to faster cure times, but may lead to difficulty maintaining sufficient oxygen at the interface for the CLIP process to be effective. Moreover, since the light intensity decays as it passes through the polyermizable liquid, the percent monomer to polymer conversions may not be constant throughout the exposed region. Controlling a level of oxygen concentration may reduce exposure times and increase print speeds by effectively maintaining a level of oxygen at the build plate and polymerizable liquid interface. The oxygen concentration profile may also be controlled to provide more consistent percent monomer to polymer conversions in view of variations of light intensity.

Additional Build Plate Materials.

Any suitable material may be used to form the build plates described herein, including multi-layer build plates and/or build plates formed of more than one material. For example, the flexible layer (used alone or with additional supports or layers) may include a woven glass fabric (fiberglass or e-glass) with a crosslinked silicone elastomeric coating (such as room temperature vulcanized (RTV) silicone), which may be lightly infiltrated into the glass fiber fabric to provide mechanical durability. The oxygen permeability of silicone elastomer (rubber) is similar to Teflon® AF-2400. Such a configuration may be used alone or affixed (adhesively adhered) to a glass plate with the unfilled areas of the fabric available for air (oxygen) flow. Sulfonated tetrafluoroethylene based fluoropolymer-copolymers, such as Nafion® from Dupont may also be used.

In some embodiments, asymmetric flat sheet membranes which are currently used in very high quantity for water purification applications (see U.S. Patent Publication No. 2014/0290478) may be used. These membranes are generally polysulfone or polyethersulfone, and may be coated with perfluoropolymers or crosslinked silicone elastomer to increase chemical resistance. Also poly(vinylidene fluoride) and possibly polyimide asymmetric (porous) membranes may be used, for example, if chemical resistance is a problem. Some of the membranes may be used as is without coatings. Examples of such membranes include FilmTec® membranes (Dow Chemical, Midland, Mich. (USA)). These are porous polysulfone asymmetric membranes coated with a crosslinked high Tg polyamide (with a coating thickness of about 0.1 microns). The crosslinked polyamide coating should provide chemical resistance. Although the oxygen permeability of the polyamide is low, the thickness of the coating may be so low that the effective oxygen transmission rate is high. The polysulfone support without the polyamide layer could be coated with a wide variety of polymers such as silicone rubber (or AF-2400) to yield very high oxygen transmission. The FilmTec® membranes are produced in very high quantity as they are the prime material used in water desalination plants. PVDF porous membranes may allow repeated use.

Although embodiments according to the present invention are described with respect to flexible layers on the build plate that include a semipermeable (or gas permeable) member (e.g., perfluoropolymers, such as TEFLON AF® fluoropolymers, it should be understood that any suitable flexible material may be used in the configurations described herein. For example, a transparent, resilient paper, such as glassine, may be used. Glassine is a relatively transparent, greaseproof paper formed of well-hydrated cellulosic fibers that has been super calendared. Glassine may be plasticized and/or coated with wax or a glaze. Glassine may be gas permeable. In some embodiments, the glassine may be coated with a thin layer of crosslinked silicone elastomer or a perfluoropolymer, such as TEFLON AF® fluoropolymers. Glassine paper is substantially grease resistant, and may have limited adhesion to the polymerizable liquid described herein.

Build Plate Coatings.

Omniphobic surfaces may be used on the build plate surface or build region. For example, patterned surfaces (either a random array of particles or micro-patterned surfaces) that contain non-miscible fluids that are pinned or held to the surface by capillary forces may be used. Such a surface may result in fluid on the surface floating along the surface. Examples of such surfaces are described in U.S. Pat. Nos. 8,535,779 and 8,574,704, the disclosures of which are hereby incorporated by reference in their entireties.

Examples of build plates that can be modified based on the disclosure given herein for use in carrying out the present invention include, but are not limited to, those described in: U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski; U.S. Patent Application Publication Nos. 2016/0046075 to J. DeSimone, A. Ermoshkin et al.; 2016/0193786 to D. Moore, A. Ermoshkin et al.; 2016/0200052 to D. Moore, J. Tumbleston et al.; PCT Patent Application Publication Nos. WO 2016/123499 to D. Moore, J. Tumbleston et al; WO 2016/123506 to D. Moore, J. Tumbleston et al.; WO 2016/149097 to J. Tumbleston, E. Samulski et al.; WO 2016/149014 to J. Tumbleston, E. Samulski et al.; and others (the disclosures of all of which are incorporated by reference herein in their entirety).

3. Example Apparatus and Methods.

According to some embodiments, FIG. 1 shows a bottom-up stereolithography apparatus 100 for producing a three dimensional object by additive manufacturing. The apparatus 100 may include a light source 13 (e.g., a UV light source), a carrier 10, a window cassette 12, a drive assembly 14, and a fluid supply 17. In some embodiments, the apparatus 100 may optionally comprise a vacuum source 18. The carrier 10 may be positioned above the light source 13. A three dimensional object 11 may be produced on the carrier 10 from a polymerizable liquid or resin 15. The drive assembly 14 may be operatively associated with the carrier 10 and window cassette 12. The drive assembly 14 may be configured to advance the carrier 10 away from the window cassette 12 a distance z. In some embodiments, the window cassette 12 may be removable from the apparatus 100.

Figure 2:
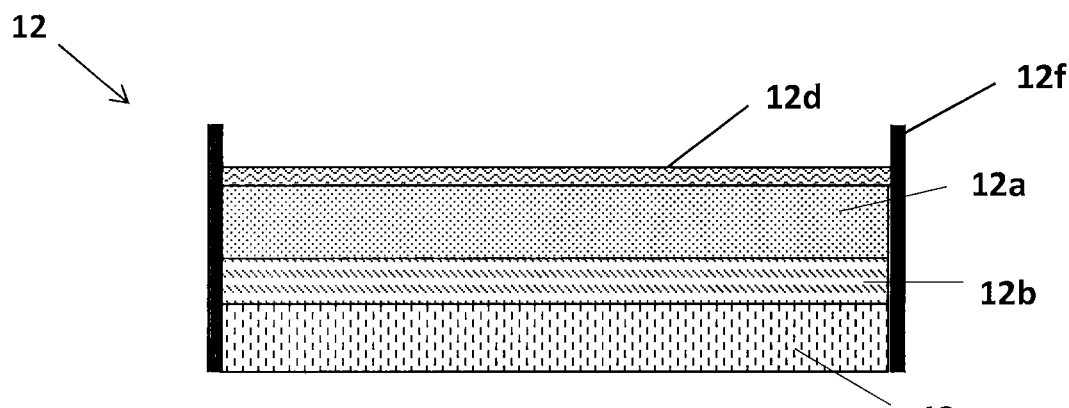
FIG. 2 is a side view of a window cassette of an apparatus of FIG. 1 according to embodiments of the present invention.

As shown in FIG. 2, in some embodiments, the window cassette 12 may comprise a semipermeable (or gas permeable) member 12d, a fluid supply bed 12a, and an impermeable member (or support layer) 12c. In some embodiments, the semipermeable member 12d may comprise an amorphous fluoropolymer (e.g., perfluoropolymers, such as TEFLON AF® fluoropolymers). In some embodiments, the fluid supply bed 12a may be in or adjacent to the semipermeable member 12d and configured to feed a polymerization inhibitor through the semipermeable member 12d. In some embodiments, the polymerization inhibitor may comprise oxygen. In some embodiments, the impermeable member 12c may comprise glass or other transparent material. In some embodiments, the window cassette 12 may further comprise a frame 12f for holding the semipermeable member 12d. In some embodiments, the fluid supply bed 12a is a lateral flow bed. For example, as shown in FIG. 2, the fluid supply bed 12a may be positioned between the semipermeable member 12d and an impermeable member 12c (e.g., a fluid channel bed). In some embodiments, the window cassette 12 may optionally comprise an adhesive layer 12b.

Figure 3:
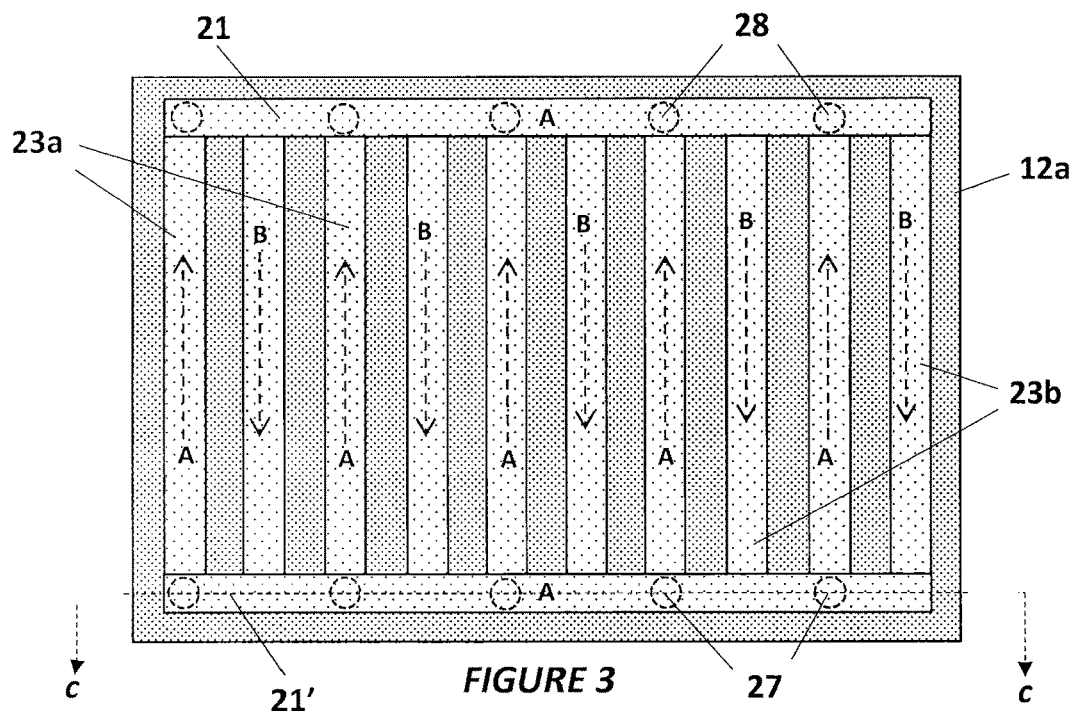
FIG. 3 is a top view of a semipermeable member of a window cassette of FIG. 2 according to embodiments of the present invention.
Figure 4:
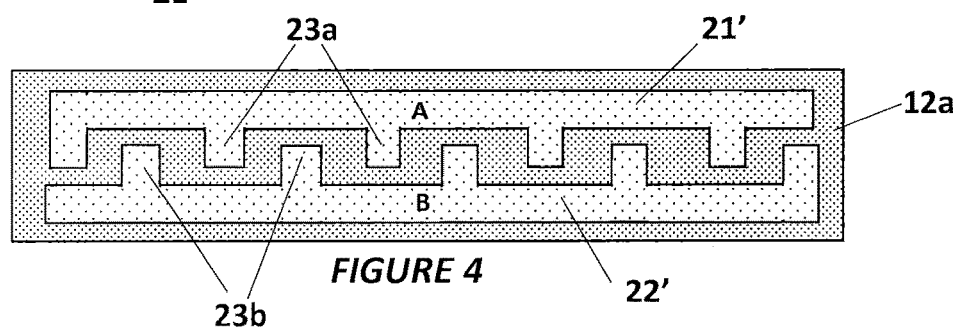
FIG. 4 is a section view of the semipermeable member of FIG. 3 taken along section line C-C.
Figure 5:
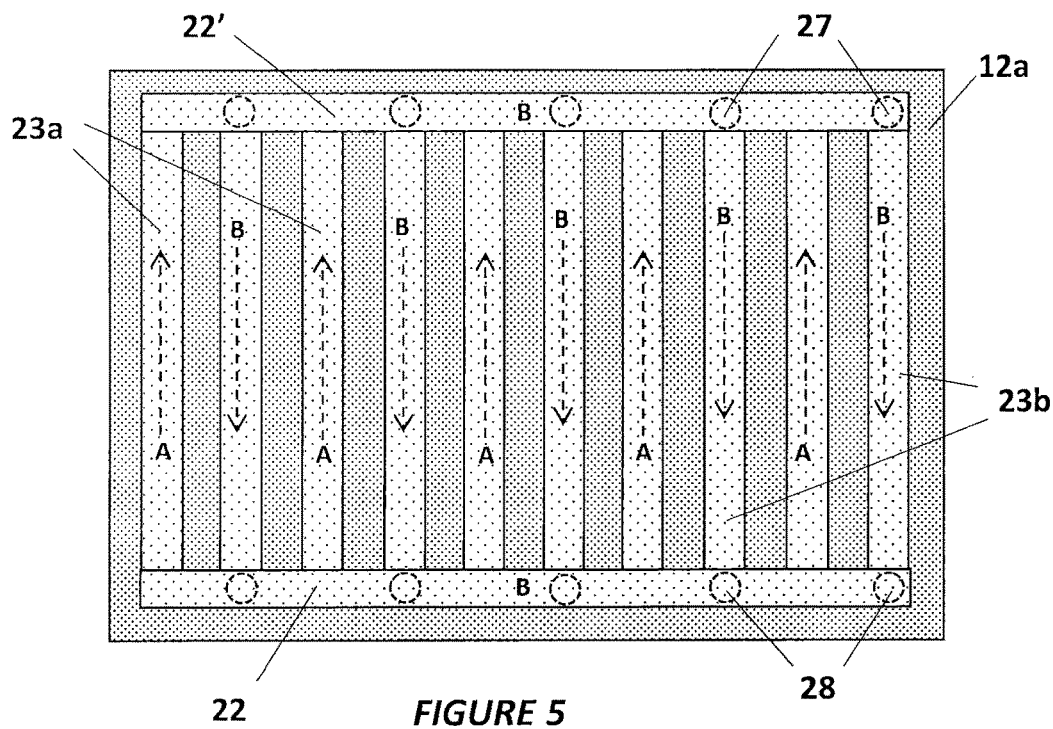
FIG. 5 is a bottom view of the semipermeable member of FIG. 3.

Referring now to FIGS. 3-5, the fluid supply bed 12a of a window cassette 12 of the present invention has at least two opposing sides 21/21', 22/22'. In some embodiments, the fluid supply bed 12a may include a first channel array 23a and a second channel array 23b, each channel array 23a, 23b having an inlet orifice 27 and an outlet orifice 28. The inlet orifices 27 and outlet orifices 28 are configured to allow the polymerization inhibitor to flow into and out of the channel arrays 23a, 23b. As shown in FIG. 4, the second channel array 23b of the fluid supply bed 12a is interdigitated with, but separate from, the first channel array 23a of the fluid supply bed 12a. In some embodiments, a vacuum source 18 may optionally be connected to both the first and second channel arrays 23a, 23b (see, e.g., FIG. 1).

Referring to FIG. 3 and FIG. 5, the interdigitated first channel arrays 23a may alternate with the interdigitated second channel arrays 23b within the window cassette 12. From each inlet orifice 27, a polymerization inhibitor flows through each interdigitated channel 23a, 23b in a direction from a higher pressure to a lower pressure. The direction that the polymerization inhibitor flows alternates within each interdigitated channel 23a, 23b. For example, the polymerization inhibitor within the first channel arrays 23a flows in a first direction and the polymerization inhibitor within the second channel arrays 23b flows in an second opposite direction. This configuration of interdigitated channels 23a, 23b having a alternating and opposing flow directions of the polymerization inhibitor can allow the polymerization inhibitor to be evenly dispersed across window cassette 12. Thus, by allowing the polymerization inhibitor to flow in alternating and opposite directions within the window cassette 12, the degree of oxygen depletion can be made more uniform across the window cassette 12, thereby allowing the oxygen to more uniformly diffuse through the semipermeable member 12d and into the resin 15.

Figure 6A:
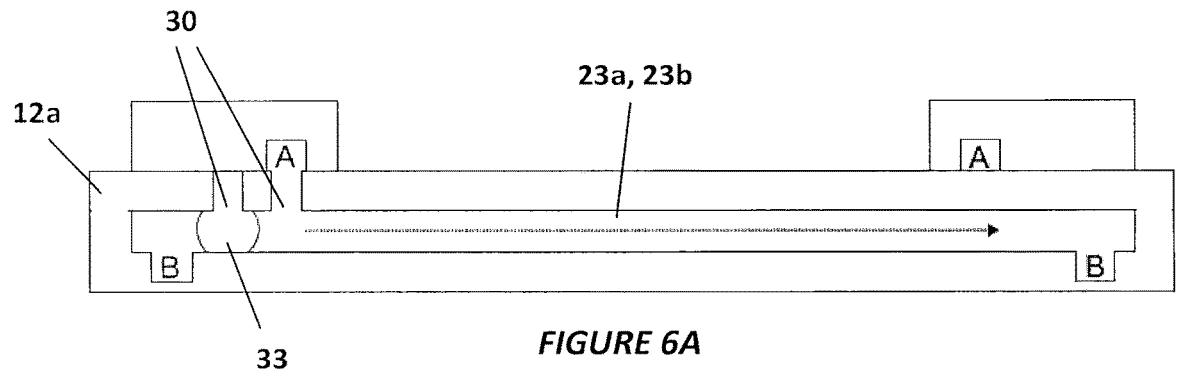
FIGS. 6A and 6B are side views of an alternative window cassette of an apparatus of FIG. 1 comprising an upper and a lower manifold according to embodiments of the present invention.
Figure 6B:
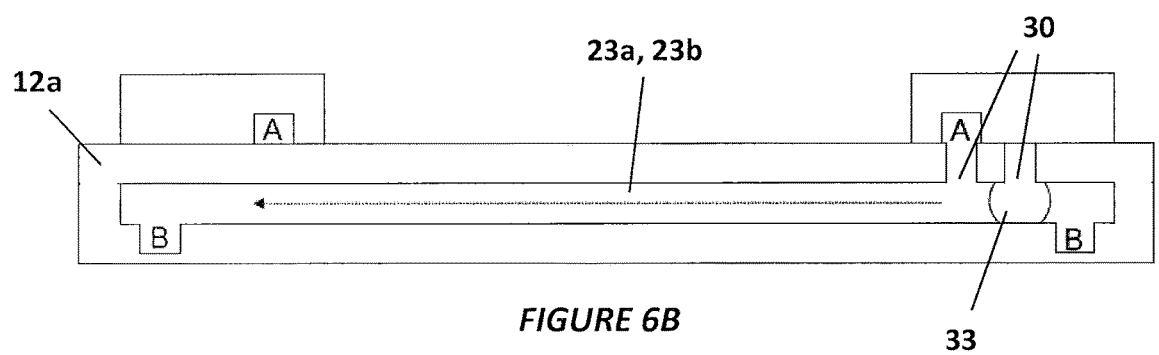

In some embodiments, the fluid supply 17 of the apparatus 100 may be connected to the first channel array 21 and second channel array 22. In some embodiments, the fluid supply 17 may comprise a polymerization inhibitor (e.g., oxygen). In some embodiments, the fluid supply 17 may comprise a gas. In some embodiments, the fluid supply 17 may comprise an oxygen-enriched gas at a pressure less than atmospheric pressure. Window cassettes 12 of the present invention can be manufactured in a variety of ways. For example, as illustrated in FIGS. 6A and 6B, there is an upper manifold A and lower manifold B on either side of the channel(s) 23a, 23b. The upper manifold A provides one pressure of gas (e.g., high pressure), and the lower manifold B provides another (e.g., low pressure). When the upper and lower manifolds A, B are connected and pressurized, the difference in pressure induces flow. Two holes 30 are drilled into the channel 23a, 23b on one side of the window cassette 12 to: (1) connect the upper manifold A to the lower manifold B on the opposite side of the window cassette 12; and (2) allow a sealant 33 to be injected to block the lower manifold B on the same side of the window cassette 12. On every other channel 23a, 23b, the holes 30 are drilled on opposite sides of the window cassette 12 so that flow is reversed.

Figure 7A:
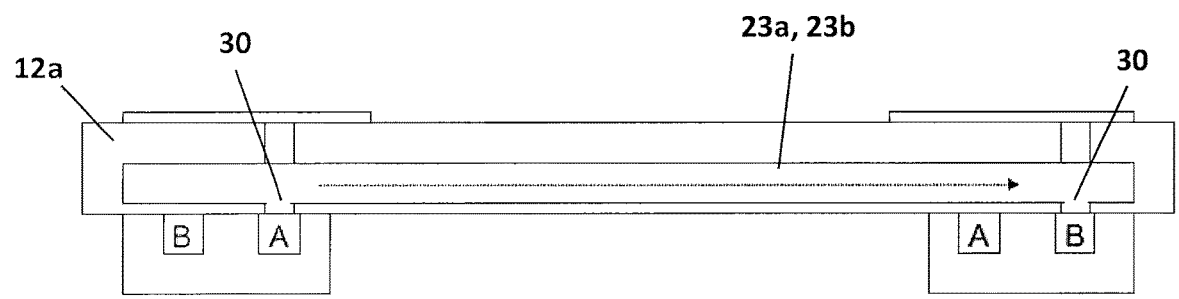
FIGS. 7A and 7B are side views of an alternative window cassette of an apparatus of FIG. 1 comprising two concentric manifolds according to embodiments of the present invention.
Figure 7B:
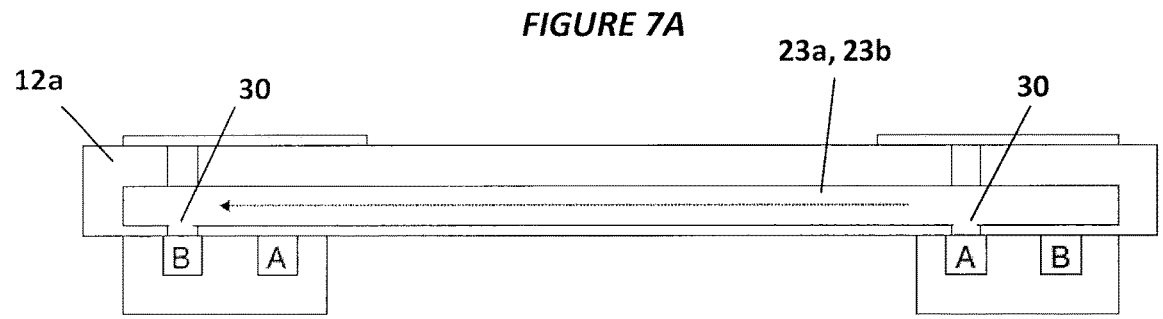

In another example as shown in FIGS. 7A and 7B, there are two concentric manifolds A, B running around the window cassette 12. The outer manifold B provides one pressure of gas (e.g. low pressure), and the inner manifold A provides another (e.g., high pressure). When the manifolds A, B are connected and pressurized, the difference in pressure induces flow. There is material present between the channel 23a, 23b and the manifolds A, B, so that they are not connected until holes 30 are drilled. Holes 30 are drilled on opposite sides of the window cassette 12, selectively connecting either the outer manifold B or inner manifold A to the channel 23a, 23b. On opposite sides of the same channel 23a, 23b, the hole 30 is drilled into the opposite manifold A, B. After holes 30 are drilled, they are sealed from ambient pressure by sealing tape on the top side of the window cassette 12. On every other channel 23a, 23b, the holes 30 are drilled into different manifolds A, B on opposite sides of the window cassette 12 so that flow is reversed.

The foregoing is illustrative of the present invention, and is not to be construed as limiting thereof. The invention is defined by the following claims, with equivalents of the claims to be included therein.

We claim:

1. An apparatus for producing a three-dimensional object by additive manufacturing, comprising:
    (a) a light source;
    (b) a carrier positioned above said light source, on which said carrier the three-dimensional object can be produced;
    (c) a window cassette positioned between said light source and said carrier, said window cassette comprising an optically transparent semipermeable member, a frame surrounding and connected to said semipermeable member, and a fluid supply bed having at least two opposing sides, said fluid supply bed in or adjacent to said semipermeable member and configured to feed a polymerization inhibitor through said semipermeable member;
    (d) a drive assembly operatively associated with said carrier and said window cassette and configured to advance said carrier and said window cassette away from one another;
    (e) a fluid supply connected to said fluid supply bed, said fluid supply comprising the polymerization inhibitor; and
    (f) optionally, a vacuum source connected to said fluid supply bed,
    wherein said fluid supply bed comprises:
        (i) a first channel array having an inlet orifice and an outlet orifice; and
        (ii) a second channel array interdigitated with but separate from said first channel array, said second channel array having an inlet orifice and an outlet orifice.

2. The apparatus of claim 1, wherein the polymerization inhibitor flows in a first direction through the first channel array and flows in a second opposite direction through the second channel array.

3. The apparatus of claim 1, wherein the polymerization inhibitor flows through said first and second channel arrays in a direction from a higher pressure to a lower pressure, the direction alternating within each interdigitated channel array.

4. The apparatus of claim 1, comprising said vacuum source connected to said fluid supply bed, and wherein said vacuum source is connected to both said first and second channel arrays.

5. The apparatus of claim 1, wherein said fluid supply comprises a gas.

6. The apparatus of claim 1, wherein said polymerization inhibitor comprises oxygen.

7. The apparatus of claim 1, wherein said fluid supply comprises an oxygen-enriched gas at a pressure less than atmospheric pressure.

8. The apparatus of claim 1, said apparatus further comprising an upper manifold and a lower manifold connected to said first and second channel arrays.

9. The apparatus of claim 8, wherein said upper manifold provides a first pressure of gas and said lower manifold provides a second different pressure of gas to induce flow of the polymerization inhibitor through said first and second channel arrays.

10. The apparatus of claim 1, wherein said window cassette is removable from said apparatus.

* * * * *